Figure 1:
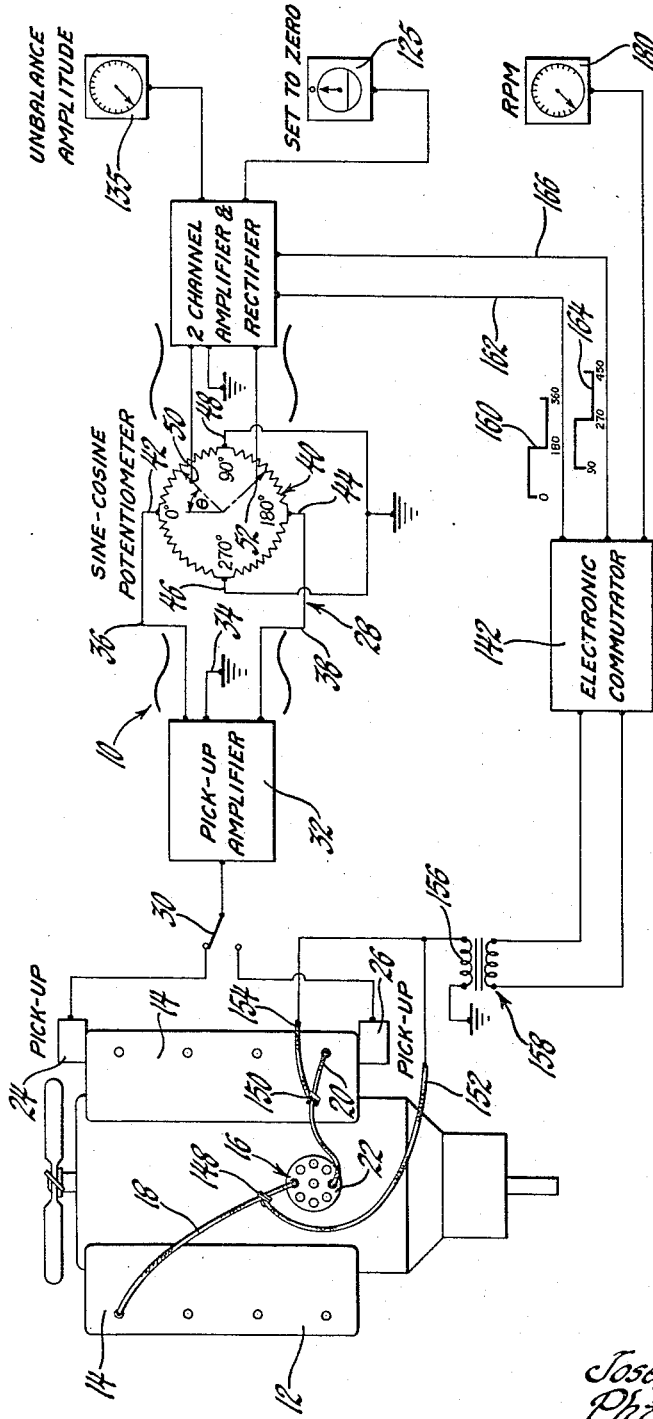

Oct. 2, 1962  J. F. LASH ETAL  3,056,300
UNBALANCE INDICATOR

Filed March 15, 1957  2 Sheets-Sheet 1

INVENTORS
Joseph F. Lash &
Philip K. Trimble
BY
R. D. Burch
ATTORNEY

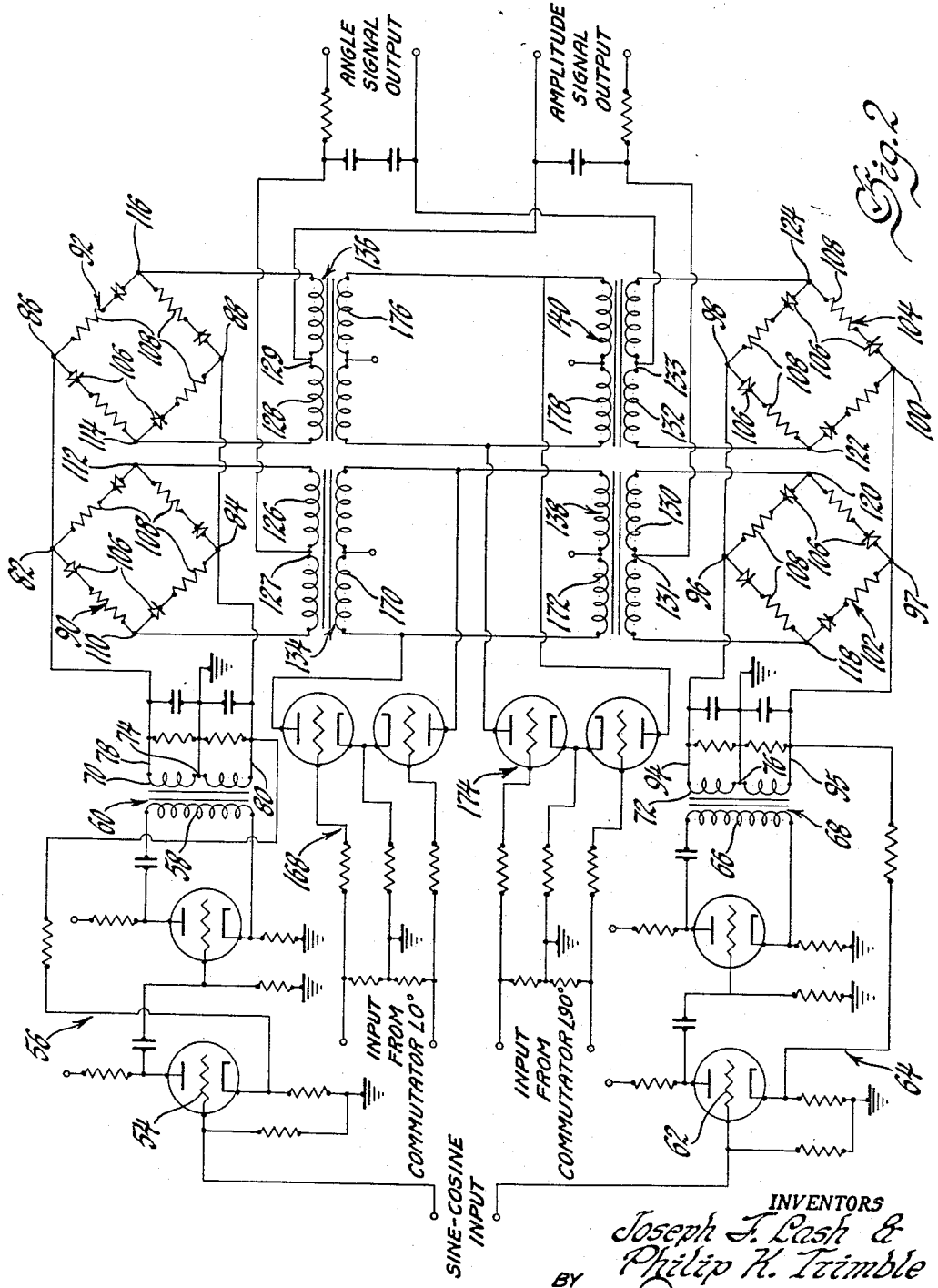

United States Patent Office 3,056,300
Patented Oct. 2, 1962

3,056,300
UNBALANCE INDICATOR
Joseph F. Lash, Ferndale, and Philip K. Trimble, Rochester, Mich., assignors to General Motors Corporation, Detroit, Mich., a corporation of Delaware
Filed Mar. 15, 1957, Ser. No. 646,319
1 Claim. (Cl. 73—462)

The present invention relates to balancing means and more particularly to means for balancing an internal combustion engine operating under its own power.

In the past it has been customary when measuring the amount of unbalance in a complete internal combustion engine to drive the engine by means of a separate motor and employ a mechanical device such as a vibrating mirror to indicate the unbalance in the engine. More recently there have been some electronic systems for analyzing the unbalance characteristics of the engine. However, in order to provide accurate readings, these systems must include means for filtering out any spurious vibrations that are not a direct result of the unbalance in the engine. This has normally been accomplished by a filter or a tuned amplifier which is tuned to a particular frequency. To be effective this amplifier must be tuned so as to have a very narrow band. As a result it is essential for the speed of the engine to be held precisely at the resonant frequency of the tuned amplifier. If the speed of the engine varies above and below the resonant frequency, the characteristics of the amplifier will vary over a very wide range. As a result the indicated amount and location of unbalance will vary considerably with changes in engine speed. If it is desired to test an engine running under its own power, the speed of the engine cannot be held sufficiently close to the resonant frequency to produce accurate readings on such a system. This is particularly true in testing an engine on its initial run in.

It is now proposed to provide an electronic system for analyzing the unbalance in an internal combustion engine in which the filtering action is obtained by chopping the unbalance signal in response to a signal from commutating means coordinated with the speed of the engine substantially as disclosed and claimed in copending application Serial No. 524,253, Balancing Machine in the name of William F. King and filed July 25, 1955, now Patent No. 2,988,918. Thus even though the speed of the engine may vary somewhat, the system will remain linear and the resultant readings will not be grossly inaccurate. In order for such a balancing system to be able to indicate the angular location of the unbalance, a reference signal must be obtained from the engine. It is proposed to provide means responsive to the ignition system to obtain such a reference signal from the ignition system. More particularly, this is to be accomplished by providing a pair of timing pickups that are adapted to be attached to a pair of spark plug wires so as to produce a pulse every engine revolution. By operating the engine at approximately a predetermined speed and load the angular relationship between the firing of the pair of spark plugs and a predetermined angular position of the crankshaft will be fixed since the spark advance will be the same for each engine tested. Even though the engine speed may vary from the predetermined speed the speed sensitive action of the distributor will produce only a relatively small change in spark advance and hence will have little effect on the fixed angular relationship between the firing of the pair of spark plugs and the predetermined crankshaft angular position. This pulse, in turn, actuates an electronic commutator that is adapted to produce the desired chopping action.

In the two sheets of drawings:
FIGURE 1 is a block diagram showing an unbalance measuring apparatus embodying the present invention.
FIGURE 2 is a wiring diagram of a portion of the unbalance measuring apparatus shown in FIGURE 1.

Referring to the drawings in more detail the present invention is embodied in an unbalance measuring apparatus 10 particularly adapted to be employed in testing an internal combustion engine 12 of the spark ignited variety which is operating under its own power. This engine 12 is of the V-type having a pair of angularly disposed banks 14 with each bank 14 including four cylinders. The charge in these cylinders is ignited by an electrical ignition system 16 having separate ignition or spark plug wires 18, 20 leading from the distributor 22 to the cylinders. The engine 12 may be supported in any suitable manner such as in a test stand. The mounting for the engine 12 is preferably sufficiently resilient to allow the engine 12 to vibrate freely as a result of any dynamic unbalance therein.

The unbalance measuring apparatus 10 includes one or more vibration pickups 24, 26 for sensing the unbalance vibrations in the engine 12 and an electronic circuit 28 for analyzing the output from the pickups 24 or 26. This circuit 28 may be substantially the same as that disclosed and claimed in copending application Serial No. 524,253 filed July 25, 1955, now Patent No. 2,988,918. In the present instance there are two pickups 24, 26 that are adapted to be attached to the engine 12 adjacent the opposite ends thereof. These pickups 24, 26 are preferably of the so-called seismic type which produce a sine wave signal indicative of the unbalance vibrations in the engine 12. These pickups 24, 26 are interconnected with a single pole double throw switch 30 which is adapted to feed the signal from one or the other of the pickups 24 or 26 into an amplifier 32 effective to increase the strength of the signal to a more useful level. This amplifier 32 is preferably substantially linear over the entire operating range or frequency at which the engine 12 will be run.

The amplifier 32 includes a grounded center tap 34 with a pair of end conductors 36, 38 that are connected to a sine-cosine resolver 40. This resolver may be of any suitable type; however, in the present instance it is a resistance bridge having the input at opposite corners 42, 44 with the conjugate corners 46, 48 grounded. A pair of movable contacts 50, 52 spaced at right angles to each other travel around the resolver. The amplitude of the signal in the first contact 50 will be a function of sine $\theta$ and the amplitude of the signal in the other contact 52 will be a function of cosine $\theta$ where $\theta$ is the angle of the mechanical location of the contacts 50, 52.

The contact 50 for the sine $\theta$ signal is connected to the grid 54 of a two stage amplifier 56 having an output feeding into the primary winding 58 of a transformer 60. The contact 52 for the cosine $\theta$ signal is connected to the grid 62 of another two stage amplifier 64 the output of which is fed into the primary winding 66 of another transformer 68. The secondaries 70, 72 of each of these transformers 60, 68 includes grounded center taps 74, 76. The opposite ends 78, 80 of secondary 70 are connected to the diagonally opposite corners 82, 84 and 86, 88 of a pair of bridge type or phase sensitive rectifiers 90, 92. The opposite ends 94, 95 of secondary 72 are connected across the diagonally opposite corners 96, 97 and 98, 100 of the rectifiers 102, 104. The rectifiers 90, 92, 102 and 104 preferably, include selenium cells 106 and load resistors 108. The conjugate corners 110—112, 114—116, 118—120 and 122—124 of each rectifier 90, 92, 102 and 104 are connected across the secondaries 126, 128, 130 and 132 of transformers 134, 136, 138 and 140. A D.C. meter 125 may be interconnected across the center taps 127, 133 of the secondaries 126, 132, while a second meter 135 may be connected across the center taps 129 and 131 of the secondaries 128, 130.

The electronic commutator 142 is adapted to generate a pair of square waves having a predetermined relation to the angular position of the moving parts in the engine 12. This commutator may be similar to the one disclosed in copending application Serial No. 550,146, filed November 30, 1955 in the name of Philip K. Trimble and assigned to the common assignee, now Patent No. 2,985,833. Although this commutator 142 may be triggered by any suitable means, in the present instance a pair of timing pickups 148, 150 are provided to sense the electrical pulses in the ignition system 16. These pickups 148, 150 are adapted to be attached to the exterior of the spark plug wires 18, 20 so as to capacitively sense the high voltage pulses therein. In a four cycle engine each cylinder will fire once every other revolution. Accordingly, there are a pair of pickups 148, 150 that are attached to wires 18, 20 for a pair of cylinders firing at equally spaced intervals. Thus there will be a pulse for each revolution of the engine. The pickup leads 152, 154 are preferably as short as possible and connected to the primary 156 of a step-down transformer 158. The transformer 158 reduces the output impedance of the pickups 148, 150 such that the capacity loading of various lengths of shielded cable between the transformer and the electronic commutator will not affect the size of the pulses. These pulses will be effective to trigger the commutator 142 and produce a first square wave 160 on the conductor 162 which starts at 0°. In addition, a second square wave 164 will be produced on conductor 166 that starts at 90° or is displaced 90° from the first square wave 160. The conductor for the first wave 160 is resistively coupled to a push-pull amplifier 168 that feeds a square wave to the primaries 170, 172 of transformers 134, 138. The conductors for the second wave 164 are resistively coupled to another push-pull amplifier 174 that feeds a square wave to the primaries 176, 178 of transformers 136, 140. If the time factor of the secondary circuits, which include the load resistors 108 and the inductance of the transformer, is long enough, a square wave will appear in the bridge circuits.

It has been found desirable to incorporate an electronic tachometer into the commutator so that the speed of the engine 12 will be indicated on the meter 180.

The operation of this unbalance measuring apparatus may be briefly summarized as follows:

The vibration pickups 24, 26 are attached to the engine 12 at the desired points and the timing pickups 148, 150 are attached to the desired ignition wires 18, 20. The engine 12 is then started and run under its own power with the speed being set at a designated amount as indicated on the tachometer 180. The switch 30 is set for one or the other of the vibration pickups 24 or 26. When the engine 12 is operating at the desired speed, the unbalance signal with an amplitude proportional to sine $\theta$ will be fed from one sliding contact 50 in the resolver 40 into the upper amplifier 56 and will appear across the two bridge demodulators 90, 92. The unbalance signal with an amplitude proportional to cosine $\theta$ will be simultaneously fed from the second sliding contact 52 in the resolver 40 into the lower amplifier 64 so as to appear across the other bridge demodulators 102, 104. These two signals will be synchronously rectified in the bridge circuits 90 and 104 by the reference square waves from the electronic commutator and a pulsating current will flow from the center taps 127 and 133 of the two transformers 134 and 140 to the null meter 125. When the angle $\theta$ of the resolver is the same as the angle of unbalance, the square waves from the secondaries 126, 132 will alternately block the flow of the current from the sine and cosine waves in bridges 90 and 104 so that the average current flow between the center taps 127, 133 will be zero and meter 125 will indicate a null reading. Thus by adjusting the resolver until the reading on the meter is a minimum or zero, the angle of unbalance will be indicated on the face of the resolver. When this condition occurs the average current flow between the center taps 129, 131 will be indicative of the amount of unbalance. The operator may then stop the engine and make any unbalance correction on the engine which is indicated by the balancing apparatus.

It is to be understood that, although the invention has been described with specific reference to a particular embodiment thereof, it is not to be so limited since changes and alterations therein may be made which are within the full intended scope of this invention as defined by the appended claim.

We claim:

An apparatus for measuring the unbalance in a multi-cylinder, four cycle, internal combustion engine operating under its own power and having an ignition system synchronized with rotation of the engine crankshaft for igniting the charge in said cylinders, said apparatus comprising at least one vibration pickup adapted to be attached to said engine so as to be responsive to unbalance vibrations in said engine and producing a signal having an amplitude proportional to said unbalance and a phase related to said unbalance, adjustable sine-cosine harmonic resolving means having a pair of input terminals connected to said vibration pickup and two pairs of output terminals, a pair of phase sensitive rectifiers each connected to one of said output terminals, a pair of timing pickups interconnected to ignition wires for a pair of cylinders firing at equal intervals and at predetermined angular positions of the engine crankshaft to produce a reference pulse whenever the crank angle of said engine is some predetermined amount corresponding to the angular position of the engine crankshaft when the ignition wires connected to said pair of cylinders are energized by the ignition system, an electronic commutator interconnected with said timing pickups to be responsive to said reference pulse, said commutator producing a pair of square wave outputs one of which is in phase with said reference pulse and the other which is 90° out of phase with said reference pulse, means connecting the in phase square wave output to one of said phase sensitive rectifiers, means connecting the other of said square waves to the other of said phase sensitive rectifiers, null indicating means connected to said one phase sensitive rectifier to indicate when the average output of the same is at a minimum, and indicating means connected to said other phase sensitive rectifier to indicate the magnitude of said signal when the output of said one phase sensitive rectifier is zero.

References Cited in the file of this patent

UNITED STATES PATENTS

| | | |
|---|---|---|
| 2,225,381 | Van Dijck | Dec. 17, 1940 |
| 2,243,457 | Esval et al. | May 27, 1941 |
| 2,291,045 | Lancor | July 28, 1942 |
| 2,359,158 | Rushing et al. | Sept. 26, 1944 |
| 2,451,863 | Oakley | Oct. 19, 1948 |
| 2,607,215 | DeBoisblanc | Aug. 19, 1952 |
| 2,608,093 | Traver | Aug. 26, 1952 |
| 2,636,381 | Hagg et al. | Apr. 28, 1953 |
| 2,656,713 | Allen | Oct. 27, 1953 |
| 2,701,474 | Goudy | Feb. 8, 1955 |
| 2,731,835 | Hellar et al. | Jan. 24, 1956 |
| 2,787,907 | King | Apr. 9, 1957 |
| 2,867,766 | Broder et al. | Jan. 6, 1959 |
| 2,924,977 | Kenyon et al. | Feb. 16, 1960 |
| 2,988,918 | King | June 20, 1961 |

FOREIGN PATENTS

| | | |
|---|---|---|
| 735,803 | Great Britain | Aug. 31, 1955 |